March 5, 1957  E. F. HEIMBUCH  2,784,016
ONE-PIECE DAMPER AND RETAINER RING FOR ANNULAR SEAL
Filed Sept. 14, 1954
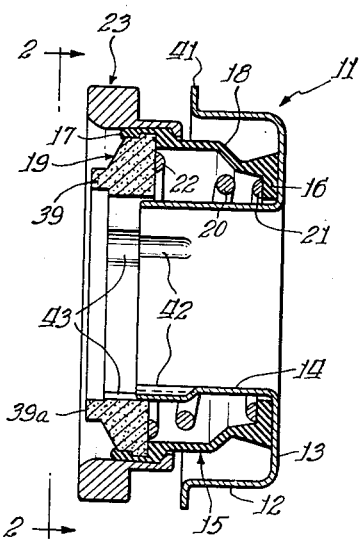
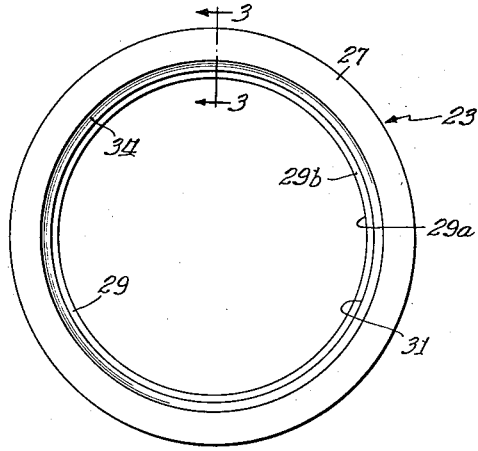
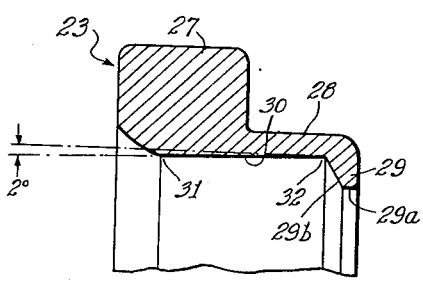
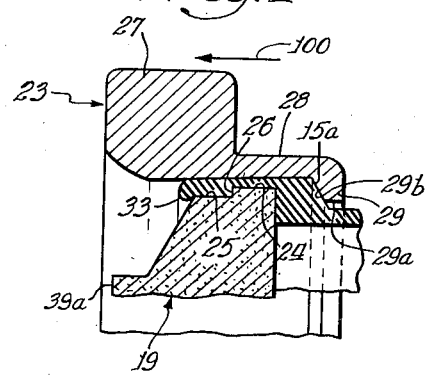
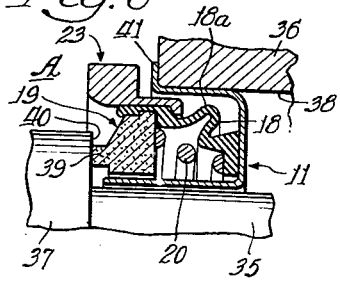
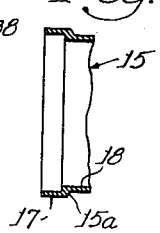
Inventor:
Elmer F. Heimbuch
By: Jones, Tesch & Darbo
Attys.

United States Patent Office 2,784,016
Patented Mar. 5, 1957

2,784,016

ONE-PIECE DAMPER AND RETAINER RING FOR ANNULAR SEAL

Elmer F. Heimbuch, Chicago Heights, Ill., assignor to Brummer Seal Company, Chicago Heights, Ill., a corporation of Illinois Application September 14, 1954, Serial No. 455,960

2 Claims. (Cl. 288—2)

This invention relates to one-piece damper and retainer ring for annular seals of the general class shown in patent to Olin Brummer No. 2,598,886 of June 3, 1952, in which the entire seal structure is preassembled so that its parts are held together within a shell for conveniently locating the seal assembly about a rotating shaft, such as the shaft of a water pump and between relatively rotatable elements of the pump, the seal assembly including a sealing washer of anti-friction material and a sealing sleeve of elastomeric material, the washer and sleeve being held in fluid tight association at all times.

In the customary operation of water pumps for automotive engines, in which seals of this class are incorporated, it has been found that vibration, at certain engine speeds, usually a lower speed, causes the coil spring which is a part of the seal assembly to vibrate at a resonant frequency with consequent objectionable noise and that this may be eliminated by increasing the mass of the seal assembly as a whole since the resonant frequency of a body depends upon its mass. It has been suggested that such increase in mass may be provided by means which does not increase the amount of space that the seal requires and that is embodied in a damper weight in the form of a ring encircling the sealing washer of the seal and attached to the seal so as to increase the weight of the parts as a whole including the spring, in such way as to damp the vibration and at the same time to avoid interference with the proper functioning thereof.

The present invention aims to provide a damper weight for the purpose referred to combined unitarily with a retainer ring for clamping the elastomeric sealing sleeve to the sealing washer. Such one-piece device effects a reduction in cost both of material for the parts and labor of assembly, while at the same time providing an efficient and secure combined damper and retainer means.

The invention will be understood and the accomplishment of the foregoing and other objects apparent from the following description, taken together with the accompanying drawings, of an illustrative embodiment of the invention, and in which drawings—

Figure 1 is an axial sectional view of a seal assembly with the present invention associated therewith;

Figure 2 is an end view taken on the line 2—2 of Fig. 1, showing the anular one-piece damper and retainer ring of the present invention;

Figure 3 is a fragmentary and enlarged cross section of the one-piece damper and retainer ring taken on the line 3—3 of Fig. 2;

Figure 4 is a similar view but showing the sealing washer and sealing sleeve associated therewith;

Figure 5 is a reduced sectional view of the rim of the sealing sleeve before assembly; and Figure 6 is a view of the seal assembly in operative position, under compression, in a water pump.

Referring in detail to the specific embodiment shown in the illustrative drawings, the metallic shell 11 is somewhat cup-shape having an outer annular wall 12, rear wall 13 and hub 14. The elastomeric sleeve 15, of natural or synthetic rubber or such elastomeric substance resistant to deterioration, has an inturned rear flange 16 and a forward cylindrical rim 17 (see Figs. 1 and 5) between which is a collapsible or distortable section 18 that accommodates axial expansion and contraction of the seal assembly. The sealing washer 19, of anti-friction material, such as a carbon and Bakelite composition, is urged forwardly in the shell 12 by coil spring 20 that has a rear convolution 21 of reduced diameter pressing against the inturned flange 16 of the sleeve and a forward convolution 22 of larger diameter pressing against the rear face of the washer.

In accordance with the present invention, the one-piece damper and retainer ring 23 serves both as a damper weight, for the purpose already explained, and as a retainer ring for locking the forward portion or rim of the elastomeric sleeve 15 to the washer 19.

As clearly shown in the drawings, and as best seen perhaps in Fig. 4, the washer 19 has a forwardly stepped-down periphery including its largest diameter 24 and a reduced diameter 25 with a forwardly facing shoulder 26 therebetween.

For cooperation with this dip periphery of the sealing washer 19, the unitary device 23, following the present invention, has a relatively heavy annular body portion 27, a rearwardly extending band portion 28, extending in this instance from the lower rear margin of the body portion 27, and an inturned annular lip 29, at the end of the band portion.

As will be best seen from Fig. 3, the internal face 30 of the unitary device 23 is tapered in a reverse or undercut taper from a relatively smaller internal diameter 31, adjacent the forward edge of the device 23, to a relatively larger internal diameter at the point 32, adjacent the lip 29, so that the device 23, and particularly its band portion 28, is undercut adjacent the lip 29 so as to have a slightly larger internal diameter at that point than adjacent its forward margin as at 31. This reverse or undercut taper is desirably of the order of two degrees from a line parallel with the axis of the ring.

As seen in Fig. 5, the rim 17 of the elastomeric sleeve 12 is normally cylindrical. In assembly, the unitary device 23 is placed in position loosely about the sleeve to the rear of cylindrical rim 17, then the sealing washer 19 is inserted into the rim 17, the spring 20 being first placed within the sleeve, and finally the unitary damper and retainer ring 23 is pulled or pushed forwardly in the direction of the arrow 100 to the position shown in Figs. 1, 4 and 6, over and onto the rim 17, and onto the cylindrical periphery of the washer. In this operation, the rim 17 of the elastomeric sleeve is stretched into conformity with the periphery of the washer 19, since the largest diameter of the washer at 24 is such that the rim 17 is under pressure in the space between the washer at its largest diameter 24 and the adjacent internal face 30 of the member 23. Furthermore, the cross-sectional thickness of the sleeve rim 17 before assembly as shown in Fig. 5 is slightly greater than the space between the washer, at its greatest diameter 24, and the internal face 30 of the member 23. The lip portion 29 has an internal diameter as at 29a smaller than the diameter of the sleeve rim 17 and the washer periphery 24, to limit forward movement of the member 23 after clamping movement is completed, and the lip portion 29 is internally beveled as at 29b to conform to a similar shoulder 15a on the sleeve 15 and to clamp the shoulder 15a between the washer and the clip.

The advantageous result follows that the elastomeric material of the rim 17 is stretched, or extruded, so to speak, over the washer peripheral area 24 so as to expand into the washer peripheral area 25 forwardly of 24 and to create a shoulder in the material of the elastomeric rim which conforms to and laps the shoulder 26 on the washer periphery (Fig. 4), thus providing an interlock that prevents separation of the elastomeric sleeve from the sealing washer unless the unitary device 23 be forcibly moved back rearwardly of the seal in a direction opposite to the arrow 100 to break the interlock. This desirable interlock is enhanced, and accidental retractive movement of the member 23 is guarded against, by the reverse or undercut taper 31—32 of the internal face 30 and also by swelling of the rubber rim 17 in use. The interlock in practice may be further enhanced by an extrusion of the rim material at 33 (Fig. 4) in the form of a radially inwardly turned lip on the sleeve rim beyond the forward edge of the sealing washer periphery, which provides another pair of somewhat interlocking shoulders between the sealing sleeve and the washer.

In order to facilitate movement of the member 23 into locking position as described, the inner margin of the forward edge of the member 23 is shown beveled as at 34, the bevel acting somewhat as a cam surface to start movement of the combined damper and retainer device 23 onto the rim 17 and the periphery of the washer 19, the bevel 34 for this purpose merging into the reverse or undercut taper 30 at its smallest diameter 31. It will be understood that the body portion 27 of the device 23 provides the desired extra weight of damping purposes and that the inertia of the mass is transmitted through the parts to the spring for the purpose desired as explained above.

As will be best seen from Figure 6, the combined damper and retainer ring 23 does not interfere with the proper functioning of the spring assembly and does not require any additional space for the seal. This view illustrates the seal assembly under compression in the pump mechanism in which the impeller shaft 35 rotates in a housing 36 and has fixed thereon to rotate therewith the hub 37 of a pump impeller, the seal assembly sealing the space between the housing 36 and the hub 37 against the passage of fluid from the impeller chamber A along the shaft, the shell wall 12 making a tight press fit with the housing counterbore 38, and the washer nose 39 having a surface 39a which is lapped to provide a smooth running fit with the face 40 of the impeller hub 37. It will be seen from Fig. 6 that the distortable section 18 of the sleeve member 15 is desirably collapsed away from the spring 20, as at 18a, so as to guard against interference of the spring with the sleeve. The shell 11 advantageously has an out-turned flange portion 41 that limits its insertion into the housing counterbore 38. Key formations 42 on the shell hub 14 axially slidably received in keyways 43 in the washer prevent relative rotation of the parts while permitting axial compensatory movements, as is well understood in the art.

So constructed and arranged, with a minimum number of parts, and particularly by reason of the unitary member 23, a seal structure of enhanced simplicity and efficiency is provided making possible a reduction of both material and assembly costs.

Such adaptations of the invention may be made as fall within the scope of the appended claims.

What is here claimed is:

1. In an annular seal having parts including a combined one-piece damper and retainer ring, a relatively heavy ring body portion providing an inertia responsive mass, a sealing washer within said ring spaced therefrom, an elastomeric sleeve having a cylindrical rim overlying the periphery of said washer between said ring and said washer, said ring having a portion of relatively small internal diameter between which and said washer said sleeve rim is compressed, and said ring having another portion of relatively large internal diameter extending axially over said sleeve adjacent the rear face of the washer and terminating in a radially inwardly directed annular flange, said washer having a forward face adjacent said ring portion of relatively small internal diameter and spaced axially rearwardly from the forward face of the ring, said sleeve rim having a radially inwardly turned lip lapping said forward face of the washer and also spaced axially rearwardly from the forward face of the ring, a coil spring within said sleeve pressing at one end directly upon said washer, said sleeve being between said spring and said ring, and an internal flange on the sleeve for abutment of the spring on said sleeve at the other end of the spring, whereby said damper ring is connected to the other seal parts including said washer and said spring only through said elastomeric sleeve portion and being otherwise out of contact with said other parts and said sleeve rim is positively locked to said washer.

2. In an annular seal having parts including a combined one-piece damper and retainer ring, a relatively heavy ring body portion providing an inertia responsive mass, a sealing washer within said ring spaced therefrom, an elastomeric sleeve having a cylindrical rim overlying the periphery of said washer between said ring and said washer, said ring having a portion of relatively small internal diameter between which and said washer said sleeve rim is compressed, and said ring having another portion of relatively large internal diameter extending axially over said sleeve adjacent the rear face of the washer and terminating in a radially inwardly directed annular flange, said washer having a forward face adjacent said ring portion of relatively small internal diameter and spaced axially rearwardly from the forward face of the ring, said sleeve rim having a radially inwardly turned lip lapping said forward face of the washer and also spaced axially rearwardly from the forward face of the ring, a coil spring within said sleeve pressing at one end directly upon said washer, said sleeve being between said spring and said ring, abutment means for the spring at its other end, and means securing the other end of the sleeve to said abutment means, whereby said damper ring is connected to the other seal parts including said washer and said spring only through said elastomeric sleeve portion and being otherwise out of contact with said other parts and said sleeve rim is positively locked to said washer.

References Cited in the file of this patent

UNITED STATES PATENTS

| | | |
|---|---|---|
| 1,744,218 | Ford | Jan. 21, 1930 |
| 2,379,868 | Curtis | July 10, 1945 |
| 2,404,690 | Caserta | July 23, 1946 |
| 2,445,207 | Caserta | July 13, 1948 |
| 2,645,508 | Payne | July 14, 1953 |
| 2,700,562 | Cole | Jan. 25, 1955 |